US012763501B2

(12) United States Patent
Murayama et al.

(10) Patent No.: US 12,763,501 B2
(45) Date of Patent: Oct. 13, 2026

(54) CONNECTOR, CONNECTOR ASSEMBLY, CAMERA MODULE, AND ASSEMBLY METHOD

(71) Applicant: Yamaichi Electronics Co., Ltd., Tokyo (JP)

(72) Inventors: Yuta Murayama, Tokyo (JP); Hiroshi Takahira, Tokyo (JP); Masaaki Oya, Tokyo (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 296 days.

(21) Appl. No.: 18/286,812

(22) PCT Filed: May 19, 2021

(86) PCT No.: PCT/JP2021/019063

§ 371 (c)(1),
(2) Date: Oct. 13, 2023

(87) PCT Pub. No.: WO2022/244165

PCT Pub. Date: Nov. 24, 2022

(65) Prior Publication Data

US 2024/0204431 A1 Jun. 20, 2024

(51) Int. Cl.

*H01R 12/71* (2011.01)
*H01R 13/52* (2006.01)

(52) U.S. Cl.

CPC ......... *H01R 12/71* (2013.01); *H01R 13/5202* (2013.01)

(58) Field of Classification Search

CPC ...... H01R 12/71; H01R 12/712; H01R 12/57; H01R 12/50; H01R 13/5202; H01R 13/533; H01R 13/5216; H01R 13/521

(Continued)

(56) References Cited

U.S. PATENT DOCUMENTS

| | | | | |
|---|---|---|---|---|
| 7,488,192 B1 * | 2/2009 | Eagle | .................. | H01R 12/714 439/159 |
| 11,588,266 B2 * | 2/2023 | Chiang | .................... | H01R 9/05 |

(Continued)

FOREIGN PATENT DOCUMENTS

| | | |
|---|---|---|
| CN | 201038517 Y | 3/2008 |
| CN | 205429249 U | 8/2016 |

(Continued)

OTHER PUBLICATIONS

International Search Report issued Jul. 20, 2021 in PCT/JP2021/019063.

(Continued)

*Primary Examiner* — Harshad C Patel
(74) *Attorney, Agent, or Firm* — Panitch Schwarze Belisario & Nadel LLP

(57) ABSTRACT

A connector is provided that can be mounted on a surface of a substrate by reflow soldering while ensuring waterproofness due to a seal member. A cylindrical external terminal extends in an axis direction with an outer bush in close contact with an outer circumferential face of the external terminal. An inner bush is in close contact with an inner circumferential face of the external terminal. A contact pin is inserted in the inner bush along the axis direction inside the external terminal, and the outer bush and the inner bush have heat resistance durable against a temperature of reflow soldering performed when the connector is mounted on the substrate. A connector assembly, a camera module and an assembly method are also provided.

4 Claims, 17 Drawing Sheets

(58) Field of Classification Search
USPC .......................................................... 439/629
See application file for complete search history.

(56) References Cited

U.S. PATENT DOCUMENTS

| | | | | |
|---|---|---|---|---|
| 11,757,236 | B2 * | 9/2023 | Yamazaki | H01R 12/7082 439/607.34 |
| 11,894,639 | B2 * | 2/2024 | Tsuchiya | H01R 24/44 |
| 11,949,195 | B2 * | 4/2024 | Chen | H01R 13/6315 |
| 12,191,601 | B2 * | 1/2025 | Yamamoto | H01R 24/40 |
| 12,431,677 | B2 * | 9/2025 | Tamaki | H01R 24/50 |
| 2002/0101041 | A1 * | 8/2002 | Kameyama | H01R 13/521 277/628 |
| 2003/0027463 | A1 * | 2/2003 | Miyamoto | H01R 43/0256 439/876 |
| 2005/0215118 | A1 * | 9/2005 | Asai | H01R 12/716 439/607.01 |
| 2009/0223711 | A1 | 9/2009 | Ueno et al. | |
| 2018/0287306 | A1 * | 10/2018 | Grimes | H05K 9/0058 |
| 2019/0380220 | A1 | 12/2019 | Matsuda et al. | |
| 2021/0313746 | A1 * | 10/2021 | Kato | H01R 13/6215 |

FOREIGN PATENT DOCUMENTS

| | | | |
|---|---|---|---|
| JP | 2002-231375 | A | 8/2002 |
| JP | 2005-276624 | A | 10/2005 |
| JP | 2009-171413 | A | 7/2009 |
| JP | 2009-212446 | A | 9/2009 |
| JP | 2016-024863 | A | 2/2016 |
| JP | 2017-041347 | A | 2/2017 |
| JP | 2019-040833 | A | 3/2019 |
| JP | 2019-133748 | A | 8/2019 |
| JP | 2019-216131 | A | 12/2019 |
| JP | 2021-034216 | A | 3/2021 |

OTHER PUBLICATIONS

Decision to Grant issued Feb. 6, 2024 in JP Application No. 2023-522101.

Extended European Search Report issued Mar. 4, 2025 in EP Application No. 21940779.8.

* cited by examiner

FIG. 15

| | SILASTIC SH52U | XIAMETER RBB-6650-50 (COMPARATIVE PRODUCT) |
|---|---|---|
| COMPRESSION SET (180℃/22h) [%] | 9 | 19 |
| HARDNESS CHANGE (250℃/72h) [%] | 2 | -8 |
| TENSILE STRENGTH [MPa] | 8.6 | 8.7 |
| TENSILE CHANGE (250℃/72h) [%] | -43 | -35 |
| EXTENSION [%] | 500 | 390 |
| EXTENSION CHANGE (250℃/72h) [%] | -40 | -15 |

CONNECTOR, CONNECTOR ASSEMBLY, CAMERA MODULE, AND ASSEMBLY METHOD

CROSS-REFERENCE TO RELATED APPLICATIONS

This application is a Section 371 of International Application No PCT/JP2021/019063, filed May 19, 2021, which was published in the Japanese language on Nov. 24, 2022, under International Publication No. WO 2022/244165 A1, the disclosure of which is incorporated herein by reference.

TECHNICAL FIELD

The present invention relates to a connector, a connector assembly, a camera module, and an assembly method.

BACKGROUND ART

Known standards for connectors used in on-vehicle modules are the FAKRA standard in Germany, the USCAR standard in U.S., and the like. These types of on-vehicle standard products are mounted on outside of vehicles because of the structure and thus may be required to have a waterproof structure.

In order to ensure waterproofness, Patent Literature 1, for example, discloses a configuration having an O-ring interposed between a second connector (a connector for relay fitted to a counterpart connector according to the FAKRA standard) and a rear case.

However, in the case of the configuration as in Patent Literature 1, screw holes for fastening the relay connector are required to be provided in the rear case. In such a case, the position of a substrate has to be pushed downward, which needs an increased size of the overall connector and results in a narrowed space inside the case for such a pushing operation.

Further, in the case of the configuration as in Patent Literature 1, a contact stroke of an internal conductor is required to be ensured inside the counterpart connector. Such a case also needs an increased size of the overall connector and results in a narrowed space inside the case.

Accordingly, a configuration in which the relay connector is omitted to resolve the disadvantage described above may be considered as disclosed in Patent Literature 2 and Patent Literature 3.

CITATION LIST

Patent Literature

[PTL 1]
Japanese Patent Application Laid-Open No. 2019-040833
[PTL 2]
Japanese Patent Application Laid-Open No. 2017-041347
[PTL 3]
Japanese Patent Application Laid-Open No. 2016-024863

SUMMARY OF INVENTION

Technical Problem

However, the configuration of Patent Literature 2 and Patent Literature 3 uses a through hole formed in a substrate to solder a substrate connector on the backside of the substrate and suffers from a disadvantage in terms of the thickness dimension and the weight of the substrate.

In this regard, when a substrate connector is surface-mounted on a substrate by, for example, reflow soldering or the like, a seal member such as an O-ring that ensures waterproofness may be damaged due to the heat, and the seal member may lose its waterproofness.

Accordingly, the present invention intends to provide a connector that can be mounted on a surface of a substrate by reflow soldering while ensuring waterproofness provided by a seal member and to provide a connector assembly, a camera module, and an assembly method.

Solution to Problem

To solve the above problem, a connector, a connector assembly, a camera module, and an assembly method of the present invention employ the following solutions.

A connector according to one aspect of the present invention is a connector configured to be mounted on a substrate, and the connector includes: a cylindrical external conductor extending in an axis direction; a first seal member provided in close contact with an outer circumferential face of the external conductor; a second seal member provided in close contact with an inner circumferential face of the external conductor; and an internal conductor inserted in the second seal member along the axis direction inside the external conductor, and the first seal member and the second seal member have heat resistance durable against a temperature of reflow soldering performed when the connector is mounted on the substrate.

According to the connector of the present aspect, the connector has the external conductor, the first seal member, the second seal member, and the internal conductor, and the first seal member and the second seal member have heat resistance durable against a temperature of reflow soldering performed when the connector is mounted on the substrate. Thus, it is possible to mount the connector provided with the first seal member and the second seal member on the surface of the substrate by reflow soldering while ensuring the function (waterproofness) of the first seal member and the second seal member.

An example of the material of the first seal member and the second seal member may be a silicone rubber such as SILASTIC (registered trademark) SH52U by The Dow Chemical Company.

Further, in the connector according to one aspect of the present invention, the first seal member and the second seal member have heat resistance durable against a temperature of 200° C. or higher.

According to the connector of the present aspect, the first seal member and the second seal member have heat resistance durable against a temperature of 200° ° C. or higher, and it is thus possible to mount the connector provided with the first seal member and the second seal member on the surface of the substrate by reflow soldering in the temperature environment at 200° C. or higher while ensuring the function (waterproofness) of the first seal member and the second seal member.

Further, in the connector according to one aspect of the present invention, the first seal member and the second seal member have heat resistance durable against a temperature of 200° ° C. or higher for 30 seconds or longer with a peak temperature being 260° C.

According to the connector of the present aspect, the first seal member and the second seal member have heat resistance durable against a temperature of 200° ° C. or higher for 30 seconds or longer with the peak temperature being 260° C., and thus a connector having the first seal member and the second seal member durable against reflow soldering in accordance with said temperature environment can be provided.

Further, a connector assembly according to one aspect of the present invention has: the connector described above; and a substrate with the internal conductor and the external conductor mounted on a surface of the substrate.

According to the connector assembly of the present aspect, the connector assembly has the connector described above and a substrate, and the internal conductor and the external conductor are mounted on a surface of the substrate. Thus, a connector assembly on which the connector provided with the first seal member and the second seal member is mounted on the surface of the substrate by reflow soldering can be provided.

Further, a camera module according to one aspect of the present invention has: the connector assembly described above; and a casing provided with a fitting part to which an external connector is configured to be fitted, and the connector mounted on the connector assembly is inserted in the casing with the first seal member provided between the connector and the casing.

According to the camera module of the present aspect, the camera module has: the connector assembly described above; and a casing provided with a fitting part to which an external connector is configured to be fitted, and the connector mounted on the connector assembly is inserted in the casing with the first seal member provided between the connector and the casing. Thus, it is possible to provide a camera module without a so-called relay connector while ensuring the waterproofness between the casing and the external conductor by the first seal member. Accordingly, screw holes or the like for fastening the relay connector can be omitted, and this enables a reduction in size of the camera module or expansion of the space inside the casing (the space to contain the substrate or the like) for the same size of the camera module. Further, the internal conductor is mounted on the surface of the substrate, and thus it is not required to ensure the contact stroke of the internal conductor inside the connector, and this also enables a reduction in size or expansion of the space inside the casing.

Further, an assembly method according to one aspect of the present invention is an assembly method for the connector assembly described above, and the assembly method includes: a mounting step of installing the connector on a surface of the substrate provided with solder; and a soldering step of exposing the substrate having the installed connector to a temperature environment where the solder melts.

According to the assembly method of the present aspect, the assembly method includes a mounting step of installing the connector on a surface of the substrate provided with solder and a soldering step of exposing the substrate having the installed connector to a temperature environment where the solder melts, and thus the connector provided with the first seal member and the second seal member can be mounted on the surface of the substrate by reflow soldering in a temperature environment where solder melts.

Further, in the assembly method according to one aspect of the present invention, the temperature environment where the solder melts is at 200° C. or higher.

According to the assembly method of the present aspect, the temperature environment where the solder melts is at 200° C. or higher, and thus the connector can be mounted on the surface of the substrate by reflow soldering in accordance with said temperature environment.

Further, the assembly method according to one aspect of the present invention includes a preheat step before the soldering step, the preheat step is to expose the substrate having the installed connector to a temperature environment at 150° C. or higher and 180° C. or lower for 60 seconds or longer, and the soldering step is to expose the substrate having the installed connector to a temperature environment at 200° C. or higher and 260° C. or lower for 30 seconds or longer.

According to the assembly method of the present aspect, the assembly method includes a preheat step before the soldering step, the preheat step is to expose the substrate having the installed connector to a temperature environment at 150° C. or higher and 180° C. or lower for 60 seconds or longer, and the soldering step is to expose the substrate having the installed connector to a temperature environment at 200° C. or higher and 260° C. or lower for 30 seconds or longer. Thus, the connector can be mounted on the surface of the substrate by reflow soldering in accordance with said temperature environment.

Advantageous Effects of Invention

According to the present invention, it is possible to achieve mounting on a surface of a substrate by reflow soldering while ensuring waterproofness provided by a seal member.

BRIEF DESCRIPTION OF DRAWINGS

FIG. 15 is a diagram illustrating comparison for respective indices.

DESCRIPTION OF EMBODIMENTS

A connector, a connector assembly, a camera module, and an assembly method according to one embodiment of the present invention will be described below with reference to the drawings.

[Configuration]

Figure 1:
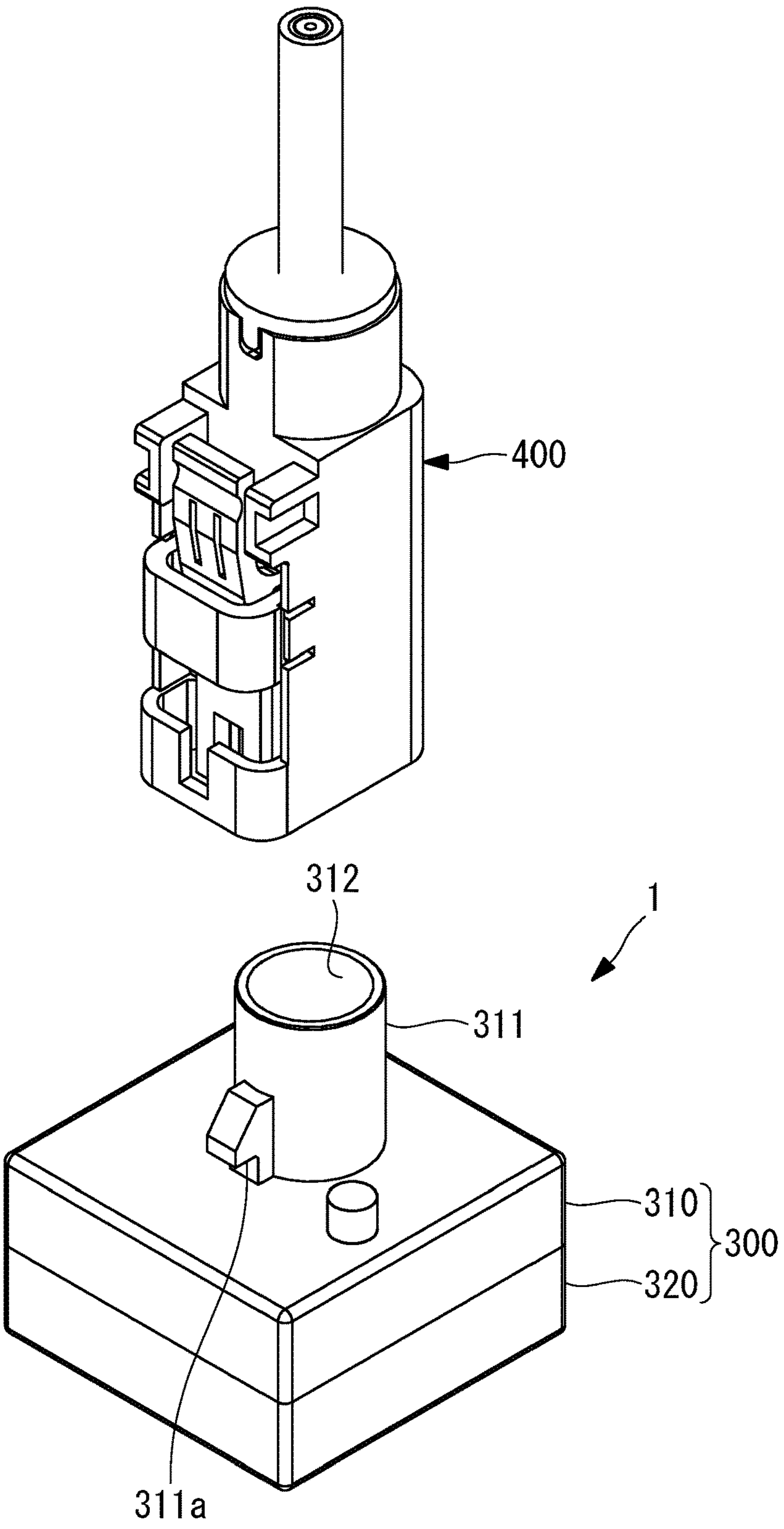
FIG. 1 is a perspective view of a camera module and an external connector according to one embodiment of the present invention.

As illustrated in FIG. 1, a camera module 1 is a drive module unit of an on-vehicle camera, for example, and is connected to an external connector 400.

An example of the external connector 400 may be of the coaxial type according to the FAKRA standard.

Figure 2:
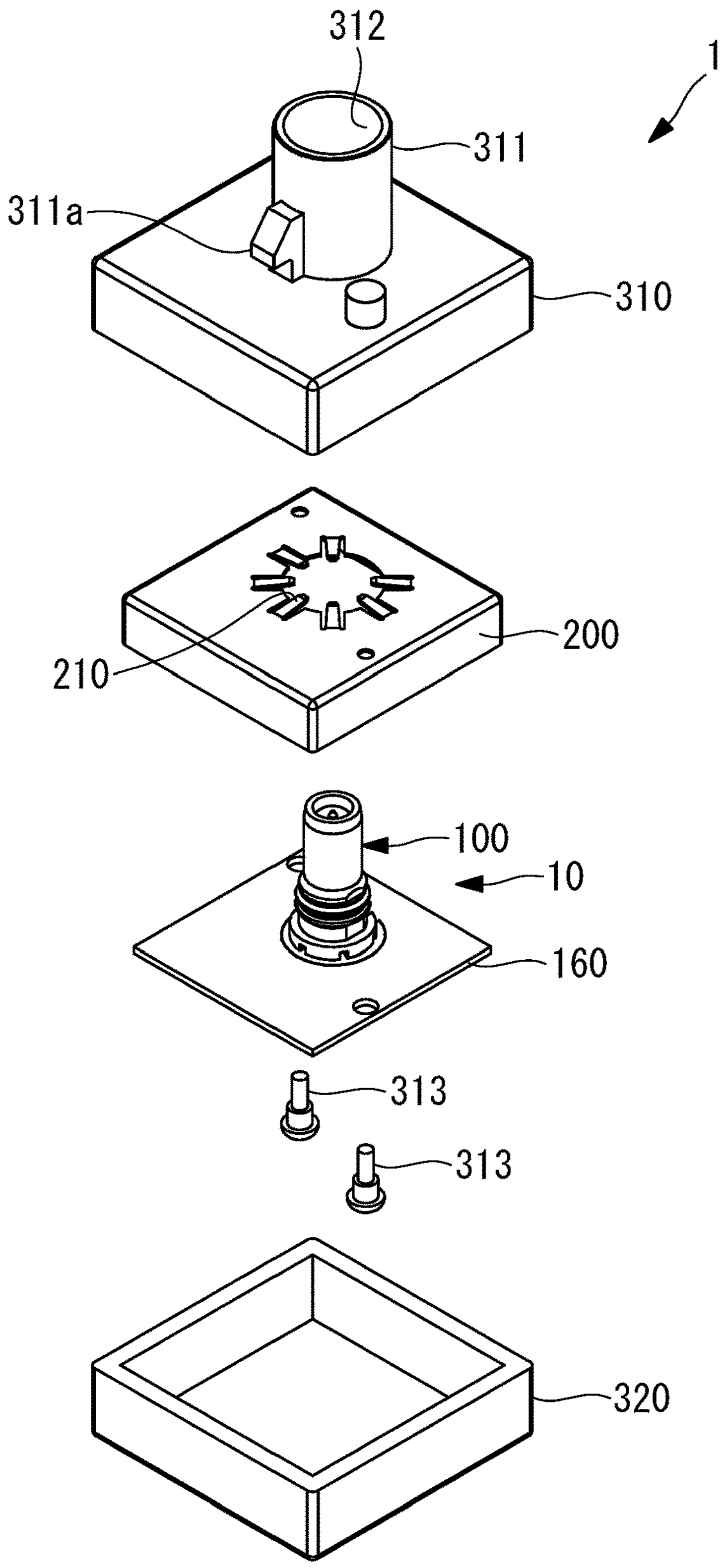
FIG. 2 is an exploded perspective view of the camera module according to one embodiment of the present invention.
Figure 3:
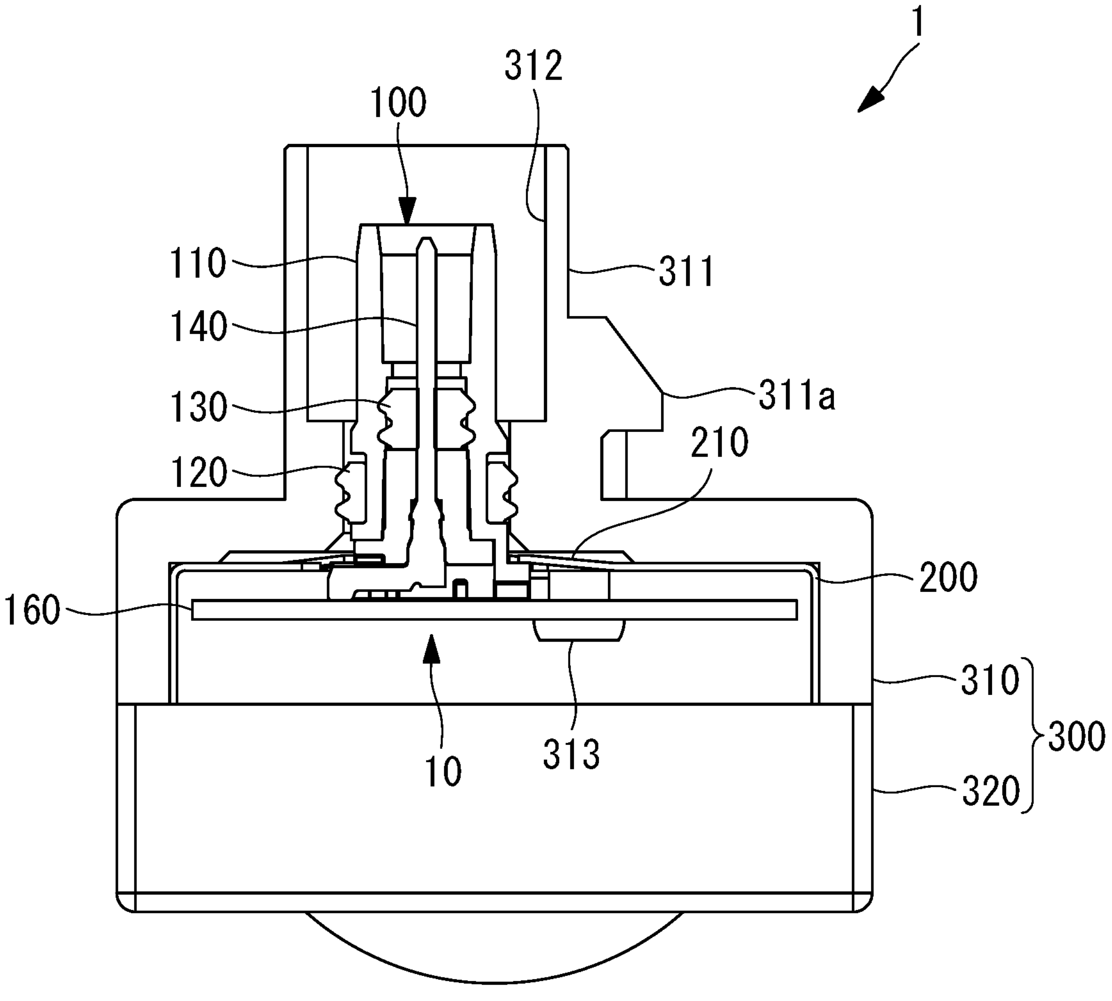
FIG. 3 is a longitudinal sectional view of the camera module according to one embodiment of the present invention.

As illustrated in FIG. 2 and FIG. 3, the camera module 1 has a connector assembly 10, a ground shell 200, and a camera case (a casing) 300 that contains the connector assembly 10 and the ground shell 200.

The camera case 300 has an upper case 310 and a lower case 320.

The upper case 310 and the lower case 320 define a space therein that contains the connector assembly 10 and the ground shell 200.

Examples of the material of the upper case 310 and the lower case 320 may be resins such as a polybutylene terephthalate resin (a PBT resin).

A cylindrical fitting part 311 is formed on the top face of the upper case 310. The fitting part 311 is a cylindrical portion for connecting the external connector 400 thereto.

A connector insertion hole 312 is formed inside the fitting part 311. A connector 100 of the connector assembly 10 described later is inserted into the connector insertion hole 312.

The protrusion 311*a* for latching the external connector 400 is formed on the outer circumferential face of the fitting part 311.

Figure 4:
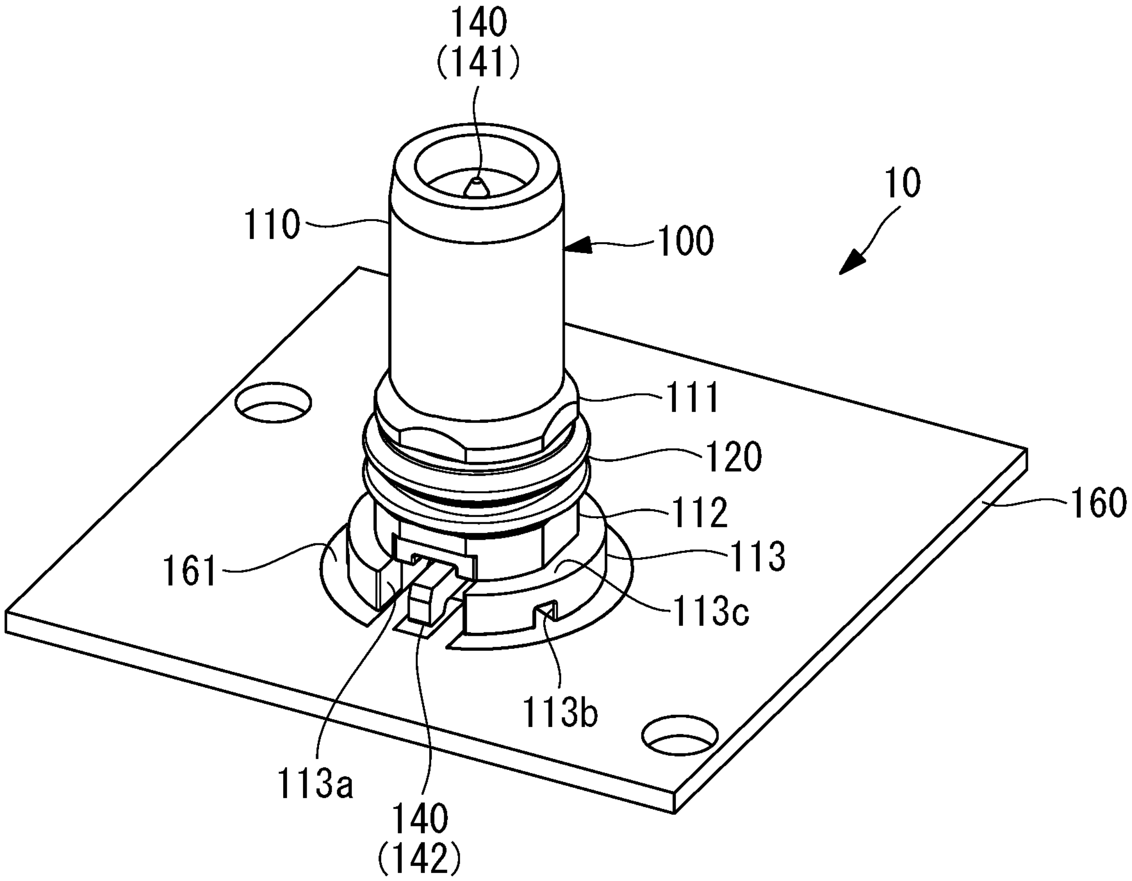
FIG. 4 is a perspective view of a connector assembly according to one embodiment of the present invention.

As illustrated in FIG. 4, the connector assembly 10 has a mount substrate 160 (hereafter, referred to as a "substrate 160") and a substrate connector 100 (hereafter, referred to as a "connector 100") mounted on the substrate 160.

Figure 5:
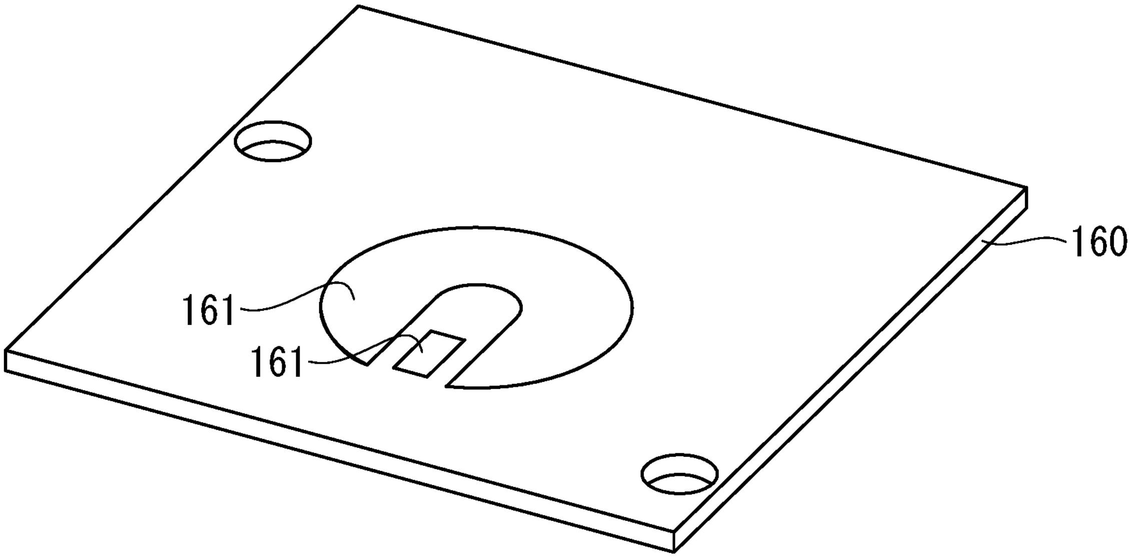
FIG. 5 is a perspective view of a substrate.
Figure 6:
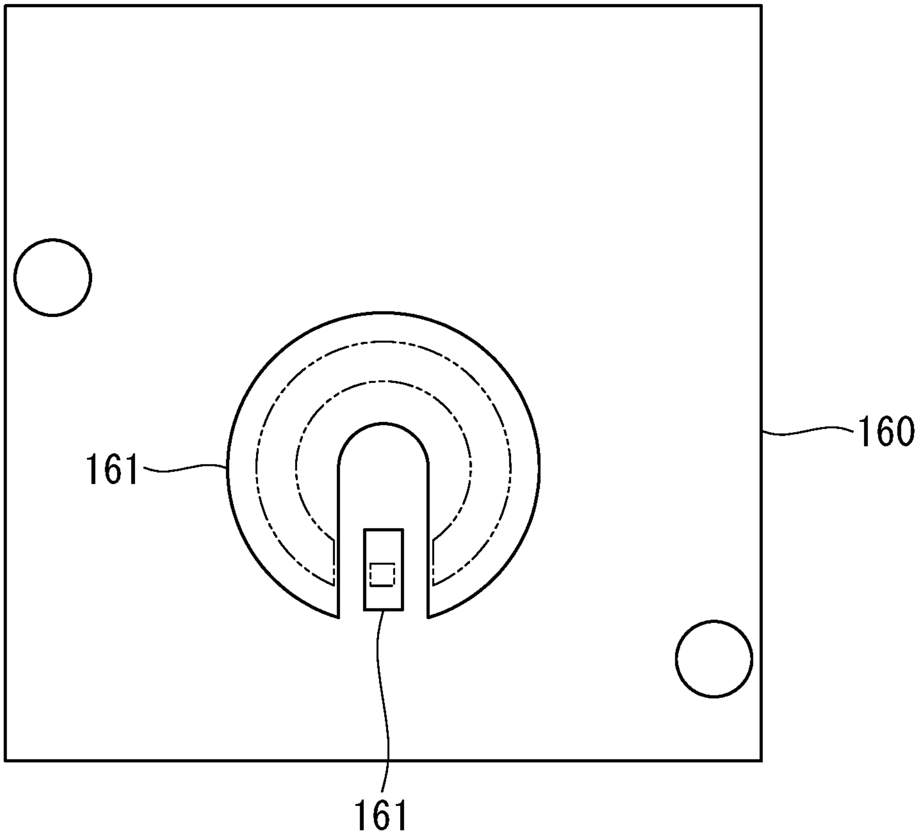
FIG. 6 is a plan view of the substrate.

As illustrated in FIG. 5 and FIG. 6, the substrate 160 is a circuit substrate for driving an on-vehicle camera, for example, and various electronic components (not illustrated) other than the connector 100 are mounted thereon.

A metallic pad 161 is provided on the surface (the top face in FIG. 5) of the substrate 160.

The pad 161 is a portion electrically connected to the connector 100 when reflow soldering described later is performed.

The pad 161 is provided in a region including at least the shape of the bottom face (depicted by a dot and dash line in FIG. 6) of the connector 100.

As illustrated in FIG. 3 and FIG. 4, the connector 100 is a component mounted on the surface of the substrate 160 and has a function of electrically connecting the external connector 400 and the substrate 160 to each other.

Figure 7:
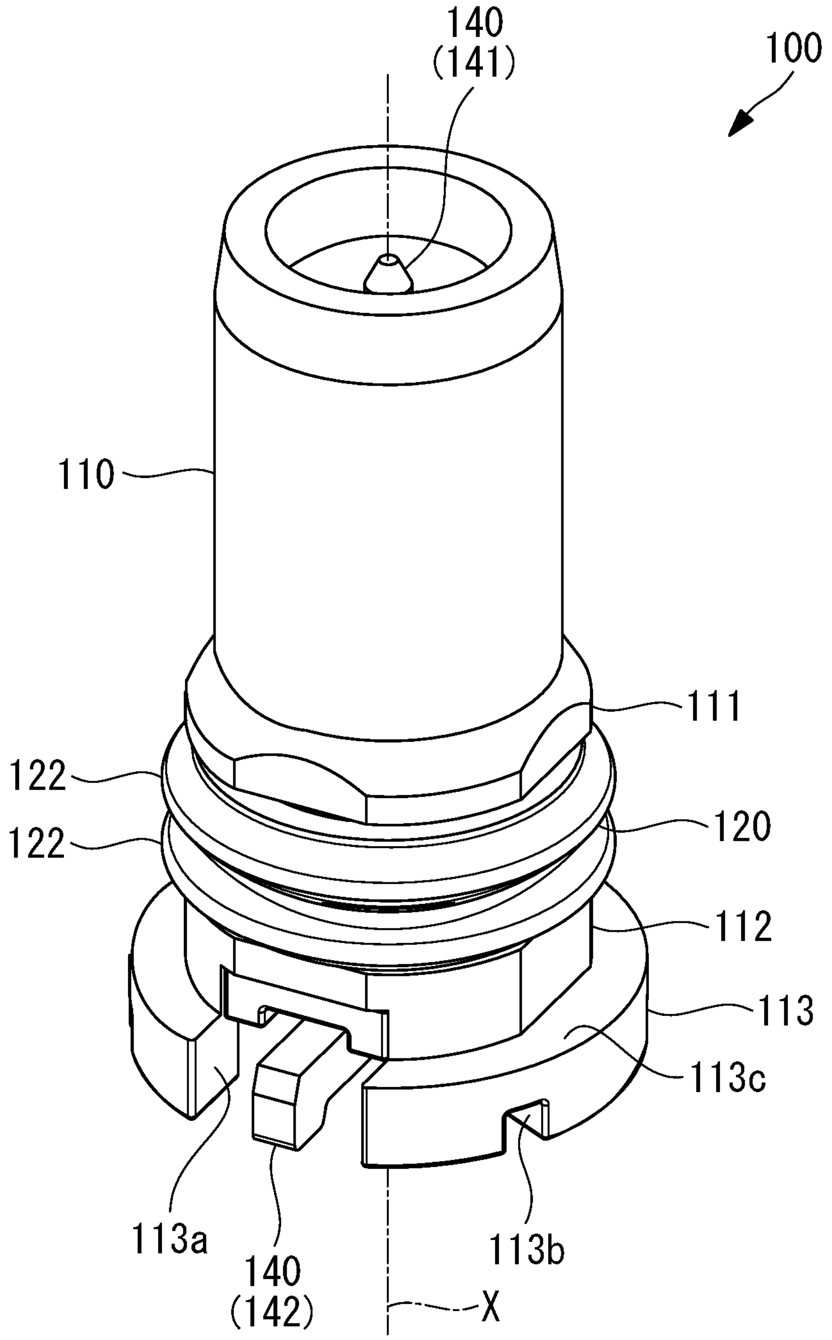
FIG. 7 is a perspective view of a connector according to one embodiment of the present invention.
Figure 8:
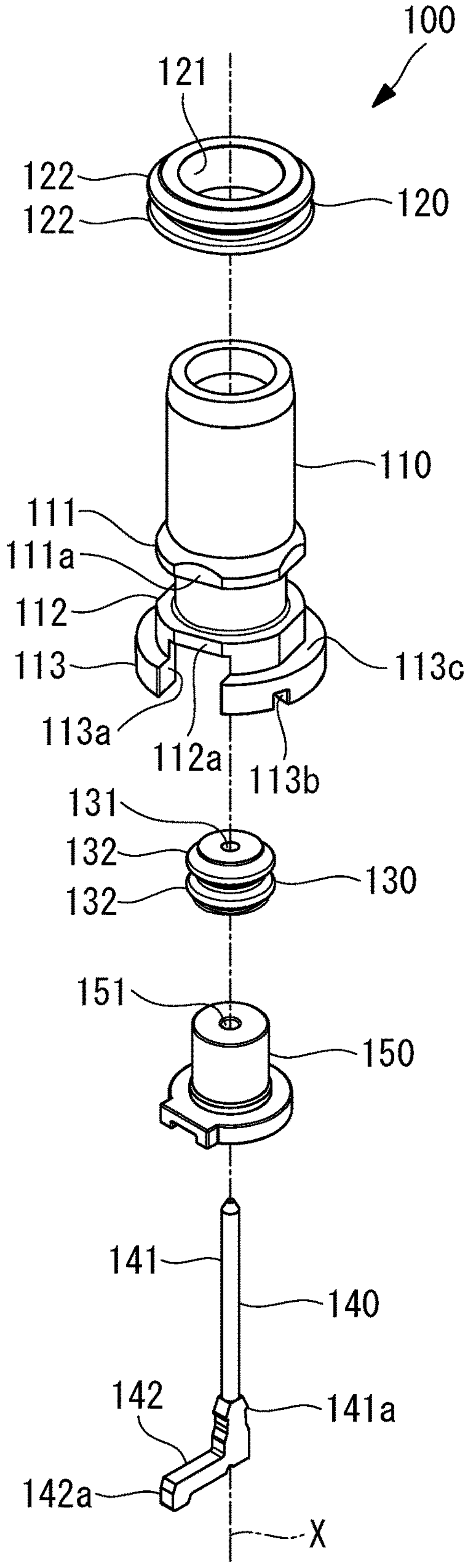
FIG. 8 is an exploded perspective view of the connector according to one embodiment of the present invention.
Figure 9:
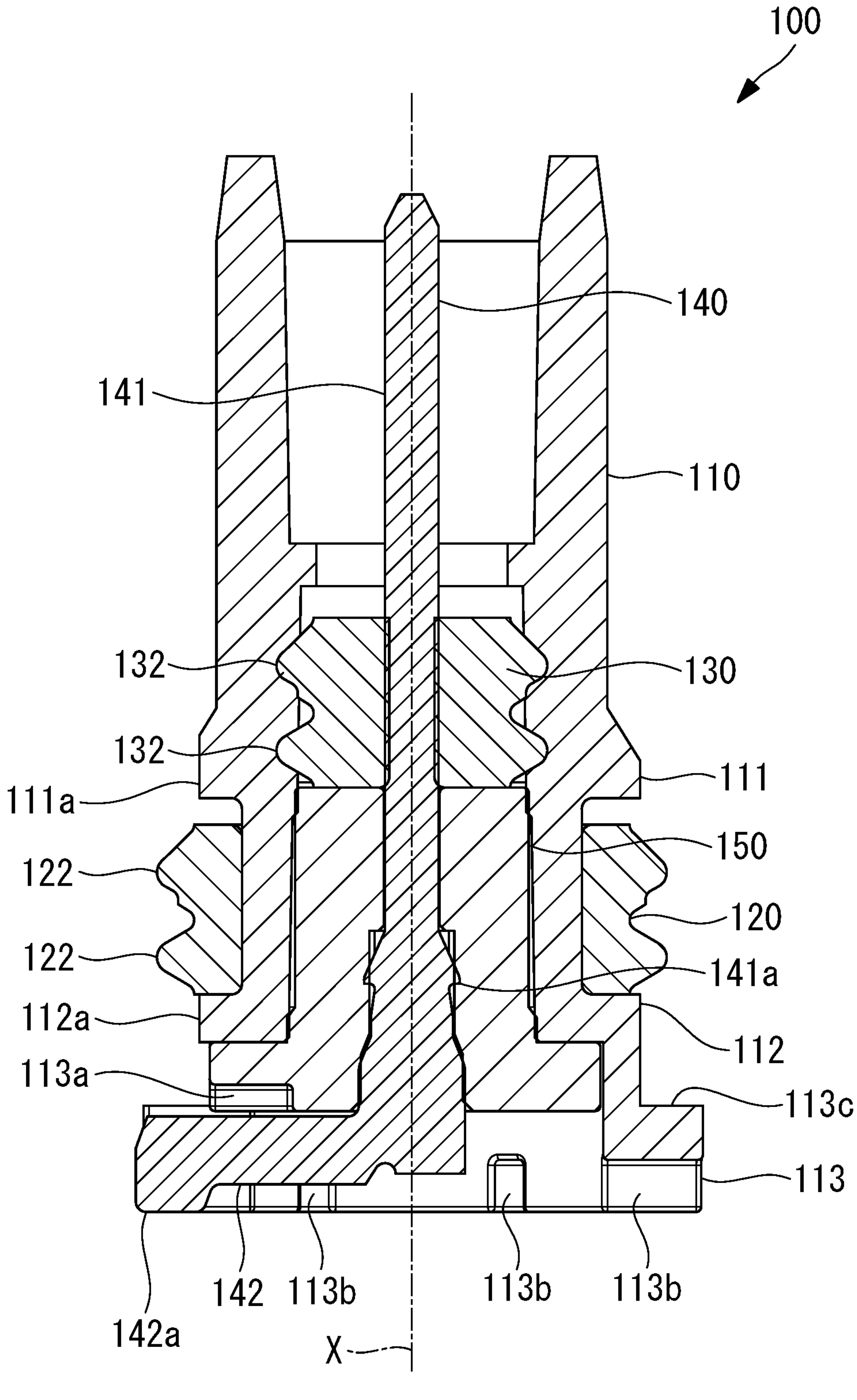
FIG. 9 is a longitudinal sectional view of the connector according to one embodiment of the present invention.

As illustrated in FIG. 7 to FIG. 9, the connector 100 has an external terminal (an external conductor) 110, an outer bush 120, an inner bush 130, a contact pin (an internal conductor) 140, and an insulator 150.

The external terminal 110 is a cylindrical member extending in the axis X direction. The external terminal 110 is formed of a conductive material and, as a specific example, is diecast-molded from a zinc alloy such as Zamak or ZDC.

The external terminal 110 has an upper flange 111, a lower flange 112, and a base 113.

The upper flange 111 is a portion located in substantially the middle along the axis X of the external terminal 110 and formed so as to protrude in the radial direction from the outer circumferential face of the external terminal 110.

The upper flange 111 has a function of restricting the position of the outer bush 120 described later together with the lower flange 112.

The top face of the upper flange 111 is formed in a taper shape for easier insertion of the outer bush 120.

The lower flange 112 is a portion located below the upper flange 111 along the axis X and formed so as to protrude in the radial direction from the outer circumferential face of the external terminal 110.

The lower flange 112 has a function of restricting the position of the outer bush 120 described later together with the upper flange 111.

The base 113 is a portion formed on the bottom of the lower flange 112 along the axis X and also is a portion soldered to the substrate 160.

As illustrated in FIG. 7 and FIG. 8, an opening 113*a* communicating with the internal space (cylindrical internal space) of the external terminal 110 is formed in the front face of the base 113. A leg part 142 of the contact pin 140 is inserted through the opening 113*a*.

As illustrated in FIG. 7 to FIG. 9, in the bottom face of the base 113, a plurality of cut-outs 113*b* are formed in the circumferential direction about the axis X. Solder melting when reflow soldering is performed flows into the cut-outs 113*b*. This can increase the contact area with solder and improve the bonding strength by soldering.

The top face of the base 113 is the ground face 113*c*, and a plurality of ground pins 210 formed in the ground shell 200 (see FIG. 2) are in contact therewith. This enables the external terminal 110 to be more reliably grounded.

A cut face 111*a* and a cut face 112*a* are formed in the upper flange 111 and the lower flange 112, respectively.

The cut face 111*a* is a plane formed such that a part of the outer circumference face of the upper flange 111 is cut off. The same applies to the cut face 112*a*.

The cut face 111*a* and the cut face 112*a* are formed at the same position as the leg part 142 of the contact pin 140 in the circumferential direction about the axis X appearing out of the opening 113*a* in planar view. This improves visibility of the state of the leg part 142 (the soldering state) in planar view.

The outer bush 120 is an elastic annular member and, due to the elasticity thereof, provides a waterproof function between the external terminal 110 and the camera case 300 (in detail, the connector insertion hole 312 formed in the upper case 310).

The outer bush 120 has a terminal insertion hole 121 and ridges 122.

The terminal insertion hole 121 is a through hole into which the external terminal 110 is inserted.

The inner diameter of the terminal insertion hole 121 in an undeformed state is smaller than the diameter of the external terminal 110 (the diameter of the external terminal 110 between the upper flange 111 and the lower flange 112). Accordingly, when the external terminal 110 has been inserted in the outer bush 120, the outer bush 120 is in close contact with the outer circumferential face of the external terminal 110. Thus, the waterproof function is provided.

The ridges 122 are portions (portions to be collapsed) formed so as to protrude in the radial direction from the outer circumferential face of the outer bush 120.

The ridges 122 are formed over the entire circumference about the axis X.

Although the ridges 122 are formed at two levels in the axis X direction in the case of the present embodiment, the number of levels of ridges 122 may be one or three or greater and can be changed as appropriate in accordance with the specification of the external terminal 110.

The diameter of the ridge 122 in an undeformed state is larger than the inner diameter of the connector insertion hole 312 formed in the upper case 310 described later. Accordingly, when the external terminal 110 having the outer bush 120 attached thereto has been inserted into the connector insertion hole 312, the outer bush 120 is in close contact with the inner circumferential face of the connector insertion hole 312. Thus, the waterproof function is provided.

The inner bush 130 is an elastic annular member and, due to the elasticity thereof, provides a waterproof function between the contact pin 140 and the external terminal 110.

The inner bush 130 has a pin insertion hole 131 and ridges 132.

The pin insertion hole 131 is a through hole into which the contact pin 140 is inserted.

The inner diameter of the pin insertion hole 131 in an undeformed state is smaller than the diameter of the contact pin 140 (the diameter of a rod-like part 141). Accordingly, when the contact pin 140 has been inserted in the inner bush 130, the inner bush 130 is in close contact with the outer circumferential face of the contact pin 140. Thus, the waterproof function is provided.

The ridges 132 are portions (portions to be collapsed) formed so as to protrude in the radial direction from the outer circumferential face of the inner bush 130.

The ridges 132 are formed over the entire circumference about the axis X.

Although the ridges 132 are formed at two levels in the axis X direction in the case of the present embodiment, the number of levels of ridges 132 may be one or three or greater and can be changed as appropriate in accordance with the specification of the external terminal 110.

The diameter of the ridge 132 in an undeformed state is larger than the inner diameter of the external terminal 110. Accordingly, when the contact pin 140 having the inner bush 130 attached thereto has been inserted into the external terminal 110, the inner bush 130 is in close contact with the inner circumferential face of the external terminal 110. Thus, the waterproof function is provided.

The outer bush 120 and the inner bush 130 described above are formed of a heat-resistant silicone rubber, for example. The details of the material will be described later.

The contact pin 140 is a long member extending in the axis X direction, which is a main contact connected to the external connector 400. The contact pin 140 is formed of a conductive material (for example, a metal). Examples of the metal may be phosphor bronze, Corson copper, beryllium copper, and the like.

The contact pin 140 has the rod-like part 141 and the leg part 142.

The rod-like part 141 is an elongated solid rod-like portion extending in the axis X direction and has been inserted in the insulator 150 described later.

A latch claw 141*a* is formed on the rod-like part 141. The latch claw 141*a* is a protrusion that enters the insulator 150 when the contact pin 140 has been inserted in the insulator 150. The contact pin 140 is secured in the insulator 150 by the latch claw 141*a*.

The leg part 142 is a portion formed so as to extend in a direction orthogonal to the axis X from the bottom of the rod-like part 141.

The tip of the leg part 142 is a ground end 142*a*. The ground end 142*a* is a portion to be soldered to the substrate 160.

The insulator 150 is an insulating member and holds the contact pin 140 inside the external terminal 110.

The insulator 150 has a pin insertion hole 151.

The pin insertion hole 151 is a through hole into which the contact pin 140 is inserted.

The latch claw 141*a* formed on the rod-like part 141 of the contact pin 140 enters the inner circumferential face of the pin insertion hole 151.

Note that a clearance of a predetermined distance is provided between the inner circumferential face of the external terminal 110 and the outer circumferential face of the contact pin 140. The clearance is provided to adjust transmission characteristics to a predetermined value. Thus, the distance of the clearance is uniquely determined by the relationship with the transmission characteristics.

The connector 100 having the components as described above is assembled as follows.

Figure 10:
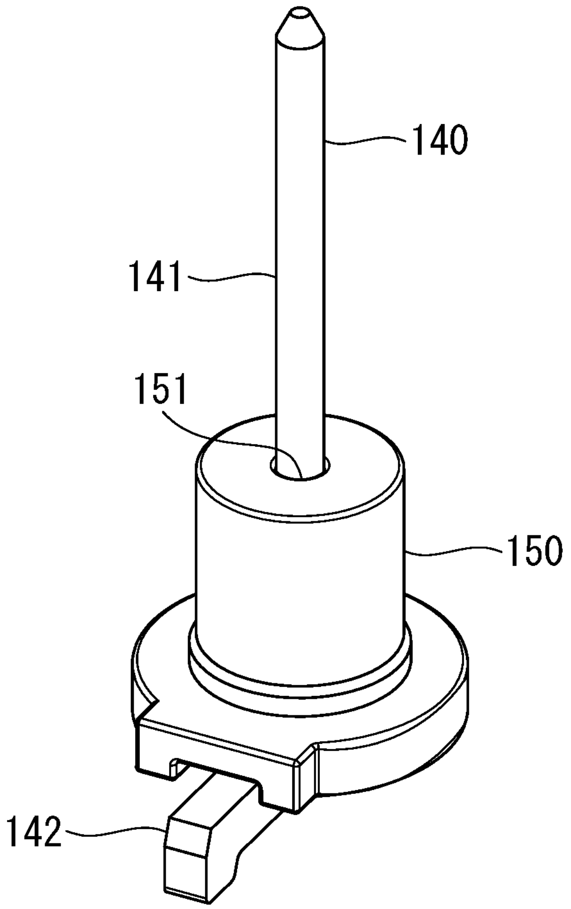
FIG. 10 is a perspective view illustrating how to assemble the connector.

As illustrated in FIG. 10, first, the rod-like part 141 of the contact pin 140 is inserted into the pin insertion hole 151 from below the insulator 150, and the contact pin 140 is pushed until the leg part 142 comes into contact with the insulator 150 (see FIG. 9). Accordingly, the tip of the rod-like part 141 projects from the top face of the insulator 150.

Figure 11:
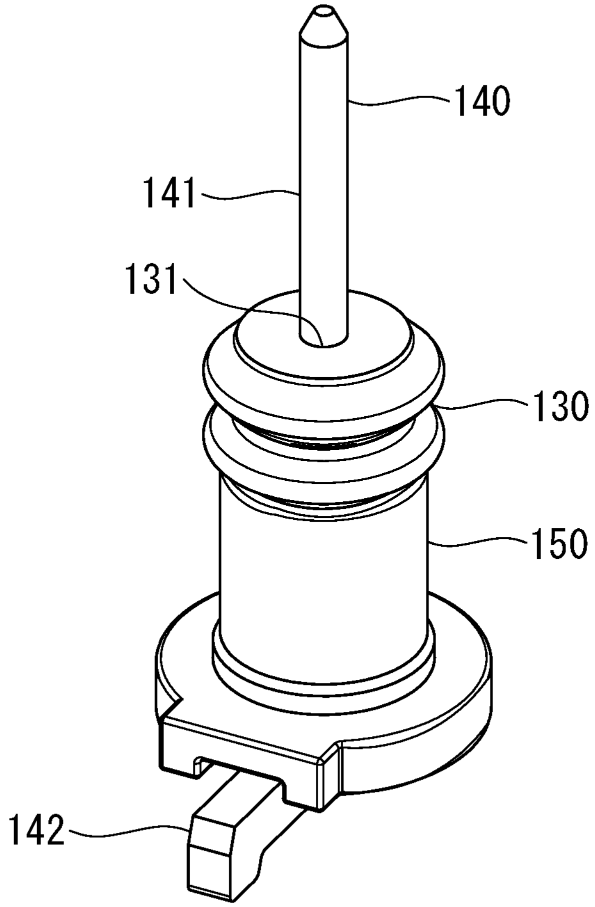
FIG. 11 is a perspective view illustrating how to assemble the connector.

Next, as illustrated in FIG. 11, the inner bush 130 is fitted from above and to the rod-like part 141 of the contact pin 140 projecting out of the insulator 150 and pushed until the bottom face of the inner bush 130 comes into contact with the insulator 150 (see FIG. 9).

Figure 12:
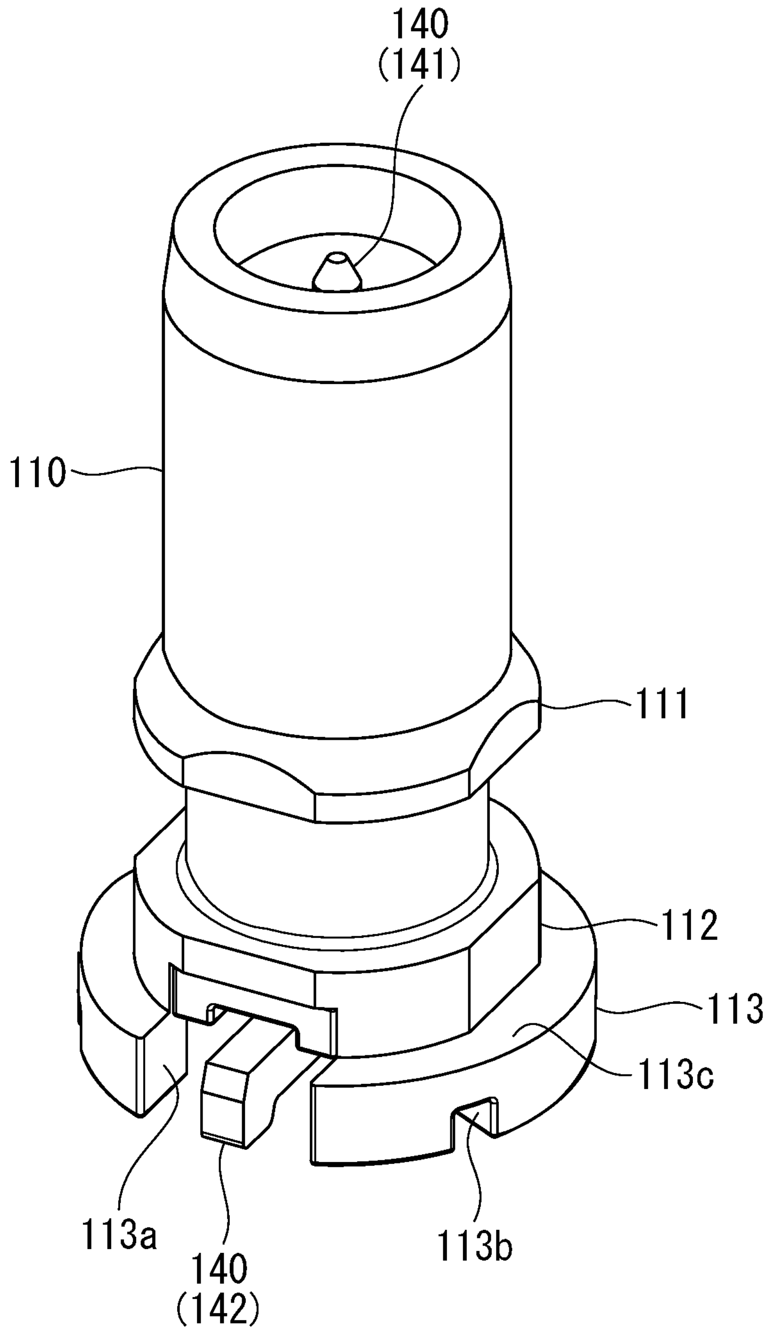
FIG. 12 is a perspective view illustrating how to assemble the connector.

Next, as illustrated in FIG. 12, the external terminal 110 is fitted from above and to the inner bush 130. At this time, the inner bush 130 comes into close contact with the inner circumferential face of the external terminal 110, and the insulator 150 to which the contact pin 140 has been secured is fitted thereto (see FIG. 9).

Figure 13:
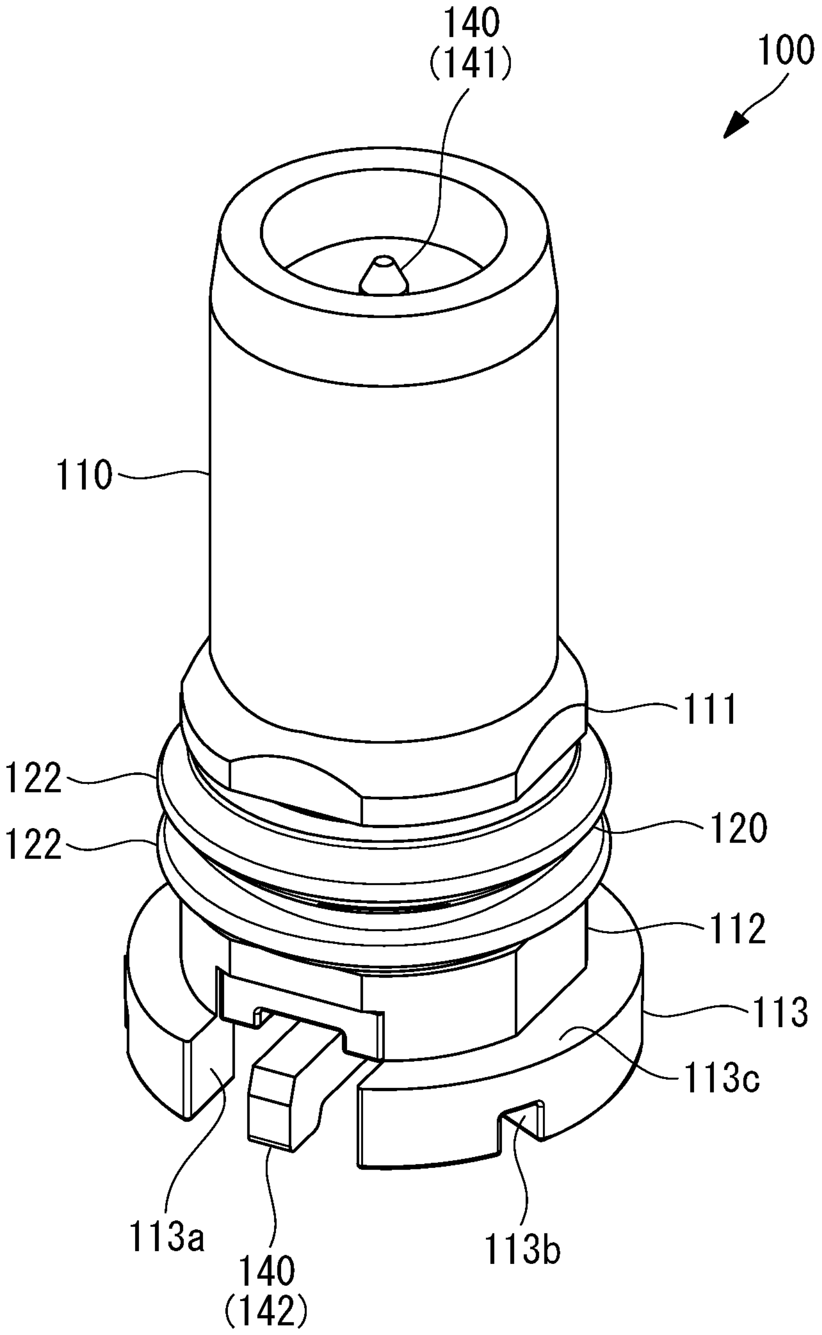
FIG. 13 is a perspective view illustrating how to assemble the connector.

Next, as illustrated in FIG. 13, the outer bush 120 is fitted from above and to the external terminal 110 and positioned between the upper flange 111 and the lower flange 112. At this time, the position of the outer bush 120 along the axis X is restricted by the upper flange 111 and the lower flange 112. Thus, the upper flange 111 and the lower flange 112 function as a positioning mechanism or a coming-off prevention mechanism for the outer bush 120.

Note that the outer bush 120 may be provided by outsert molding. This eliminates the need for fitting the outer bush 120 to the external terminal 110 and can reduce the possibility of damaging the outer bush 120.

The connector 100 configured as described above is mounted on the surface of the substrate 160 by reflow soldering. An assembly method by reflow soldering will be described later.

In the reflow soldering, the connector 100 and the substrate 160 are exposed to a high-temperature environment where solder melts. It is thus required to suitably select the material of the outer bush 120 and the inner bush 130. This is to avoid changes in physical properties of the outer bush 120 and the inner bush 130 due to exposure to the high-temperature environment resulting in a loss of the waterproof function supposed to be provided by the outer bush 120 and the inner bush 130.

Accordingly, the inventors have selected the material of the outer bush 120 and the inner bush 130 (hereafter, also collectively referred to as a "bush material") as follows.

Figure 14:
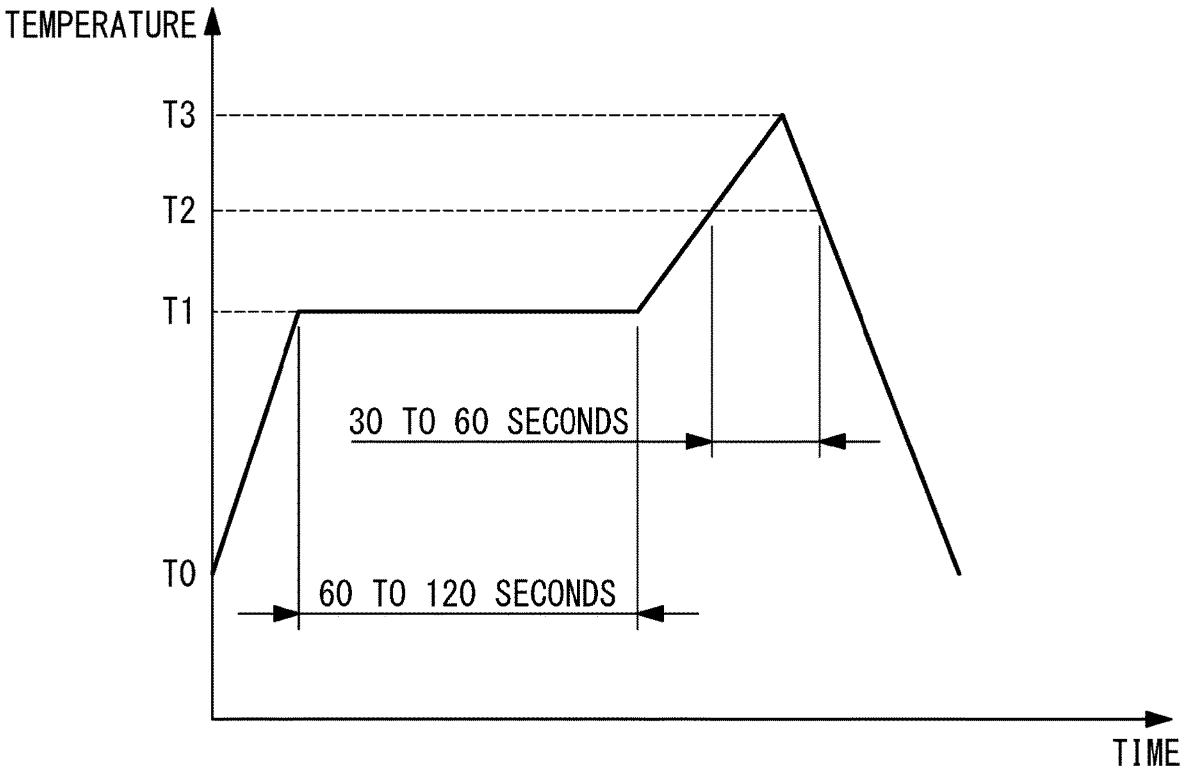
FIG. 14 is a diagram illustrating a temperature profile of reflow soldering.

First, reflow soldering is performed using a known reflow furnace based on a temperature profile as illustrated in FIG. 14.

Note that the temperature profile illustrated in FIG. 14 is a mere example and can be changed as appropriate in accordance with the type of solder to be used or the specification of the area or the like of the component to be mounted.

An example of the solder to be used may be general lead-free cream solder/solder paste such as SAC305.

In FIGS. 14, T0 to T3 are as follows.

T0: room temperature

T1: preheat temperature (150° C. to 180° C.)

T2: lowest temperature in soldering (200° C. to 220° C.)

T3: peak temperature in soldering (250° C. to 260° C.)

As illustrated in FIG. 14, first, the temperature in the furnace is increased to increase the temperature of the target (solder/soldering portion) from T0 to T1. Once the temperature of the target increases to T1, such a state is maintained for 60 seconds to 120 seconds (in a preheat step). This facilitates the solder to melt (not yet melted).

Note that the temperature of the solder is measured by a reflow checker, for example. Specifically, a temperature measuring conductive wire of the reflow checker is fixed to the soldering portion and, in this state, fed into the reflow furnace to measure the temperature of the solder.

The conductive wire is fixed by using a tape (having heat resistance) or by soldering.

Next, the temperature in the furnace is further increased to increase the temperature of the target from T1 to T3 via T2. Then, once the temperature of the target reaches T3, the temperature in the furnace is reduced to gradually reduce the temperature of the target. At this time, the temperature above T2 can be maintained for 30 seconds to 60 seconds at the target. Further, at any timing during this period, the temperature of the target is set to T3 (in a soldering step).

Accordingly, the solder melts, and the solder that has melted is then solidified.

Such a temperature profile needs to be considered to select a bush material having heat resistance durable against a temperature at which solder starts melting in reflow soldering, specifically, a temperature above 200° ° C. that is the lowest value of T2.

Herein, the heat resistance is evaluated/confirmed using, as indices, (1) compression set [%] and (2) hardness change [%], and preferably, further using, as indices, (3) tensile strength [MPa], (4) tensile change [%], (5) extension [%], and (6) extension change [%].

The compression set represents a percentage of dimensions obtained before and after a test in which a test piece with the thickness being changed by 25% is exposed to a temperature environment at 180° C. for 22 hours.

The compression set is measured by a test in accordance with JIS K 6249.

In the case of the present embodiment, it is preferable that the compression set be less than or equal to 17%.

The hardness change represents a percentage of hardness obtained before and after a test in which a test piece is exposed to a temperature environment at 250° C. for 72 hours. The hardness is measured by a test in accordance with JIS K 6253.

In the case of the present embodiment, it is preferable that the hardness change be within +5%.

The tensile strength is measured by a test in accordance with JIS K 6251.

The tensile change represents a percentage of tensile strengths obtained before and after a test in which a test piece is exposed to a temperature environment at 250° C. for 72 hours.

The extension is measured by a test in accordance with JIS K 6251.

The extension change represents a percentage of extension obtained before and after a test in which a test piece is exposed to a temperature environment at 250° ° C. for 72 hours.

An example of the selected material may be a silicone rubber such as SILASTIC (registered trademark) SH52U by The Dow Chemical Company.

FIG. 15 lists respective indices of SILASTIC SH52U and XIAMETER (registered trademark) RBB-6650-50 as a comparative product (a general silicone rubber).

Taking the above indices into consideration, a material is selected, and if the material passes a predetermined waterproof test after exposure to the same temperature environment as in reflow, then the material is employed as the bush material.

Herein, the predetermined waterproof test is a waterproof test in accordance with the waterproof standard IP69K.

[Assembly Method]

A procedure from mounting of the assembled connector 100 on the substrate 160 to assembling of the camera module 1 will be described below.

Figure 16:
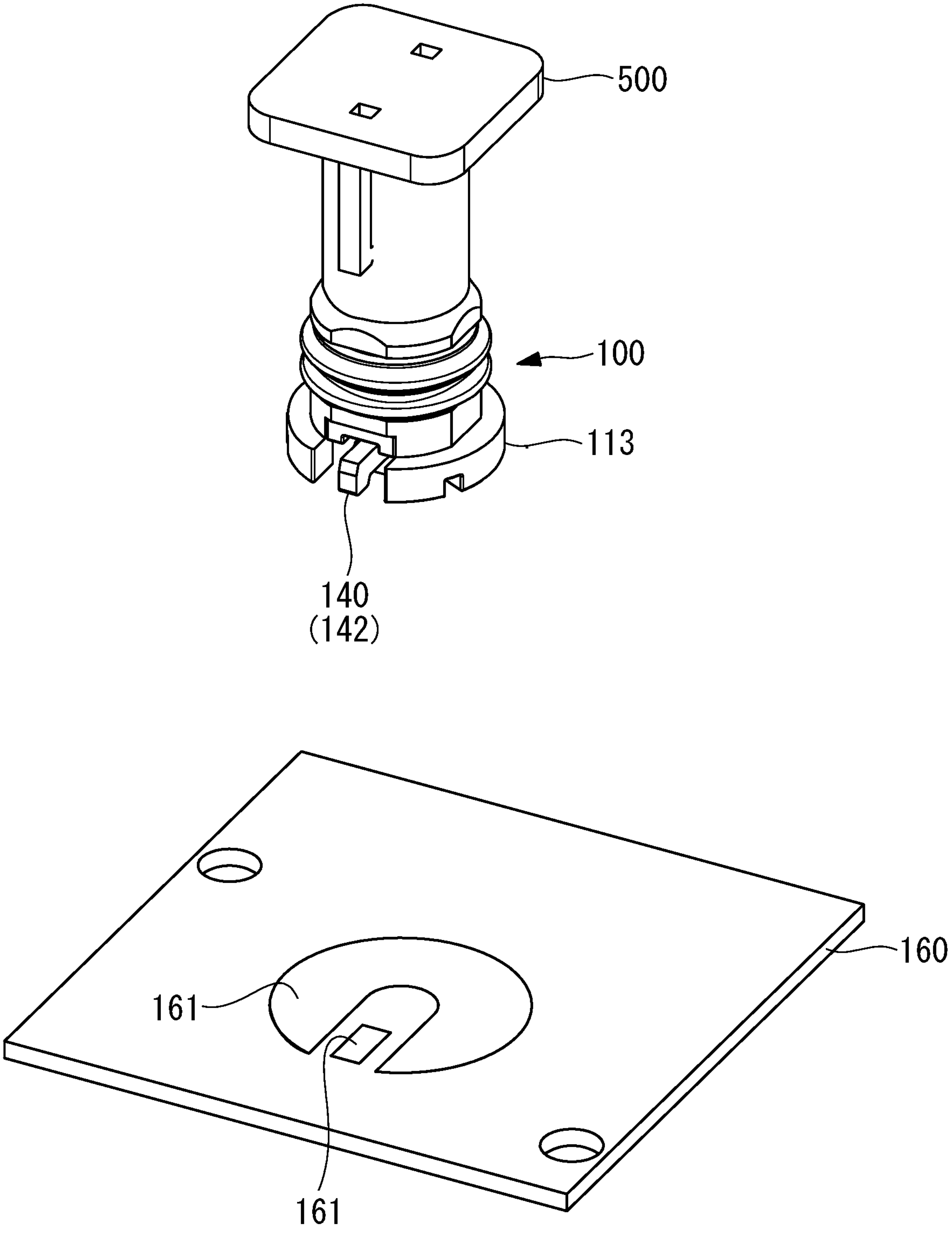
FIG. 16 is a perspective view illustrating how to assemble a connector assembly.

As illustrated in FIG. 16, first, solder (for example, cream solder/solder paste) is applied to the pad 161 of the substrate 160. The connector 100 is then sucked and lifted by a mounter 500.

Figure 17:
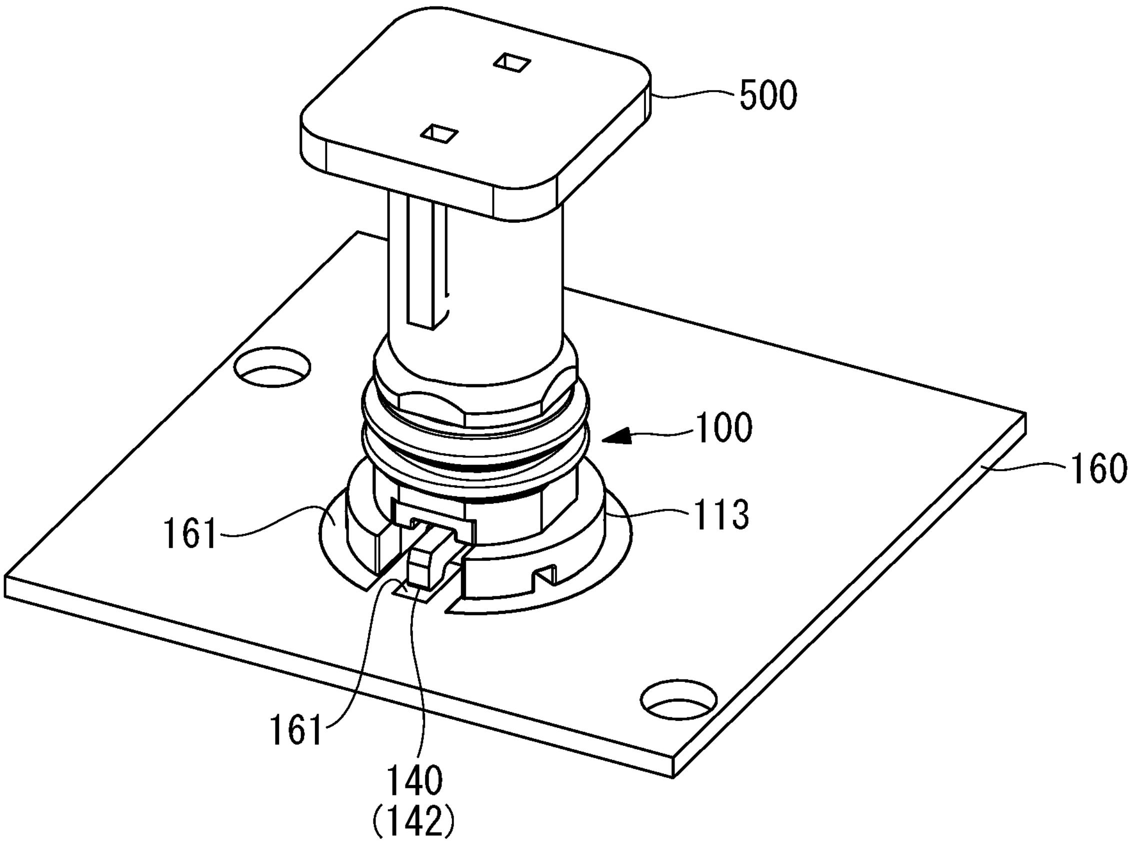
FIG. 17 is a perspective view illustrating how to assemble the connector assembly.

Next, as illustrated in FIG. 17, the connector 100 is placed on the substrate 160 so that the bottom face of the base 113 of the external terminal 110 and the bottom face of the ground end 142*a* of the contact pin 140 are located on the pad 161 (in a mounting step).

Next, reflow soldering is performed without removal of the mounter 500. Herein, the reflow soldering includes the preheat step and the soldering step described above. The connector 100 is mounted on the surface of the substrate 160 via these steps.

Note that, after reflow soldering described above, other components may also be mounted on the backside of the substrate 160 by reflow soldering. In such a case, the temperature condition of the second reflow soldering is lower than the temperature condition of the first reflow soldering (the reflow soldering for mounting the connector 100). This is for preventing the solder solidified by the first reflow soldering from remelting.

The connector assembly 10 assembled as described above is assembled from below and to the upper case 310 with the ground shell 200 interposed therebetween, as illustrated in FIG. 2 and FIG. 3. Once the connector 100 has been inserted in the connector insertion hole 312, the connector assembly 10 is fixed to the upper case 310 from below by screws 313.

Next, the lower case 320 is fixed to the upper case 310 by one or more screws (not illustrated) from below. Accordingly, the camera module 1 is completed.

According to the present embodiment, the following advantageous effects are achieved.

The embodiment has the external terminal 110, the outer bush 120, the inner bush 130, and the contact pin 140, and the outer bush 120 and the inner bush 130 have heat resistance durable against a temperature (for example, a temperature of 200° C. or higher) of reflow soldering performed when the connector 100 is mounted on the substrate 160. Thus, while ensuring the function (waterproofness) of the outer bush 120 and the inner bush 130, it is possible to mount the connector 100 provided with the outer bush 120 and the inner bush 130 on the surface of the substrate 160 by reflow soldering in the temperature environment at 200° ° C. or higher.

Further, the outer bush 120 and the inner bush 130 have heat resistance durable against a temperature of 200° C. or higher for 30 seconds or longer with the peak temperature being 260° C., and it is thus possible to provide the connector 100 having the outer bush 120 and the inner bush 130 durable against reflow soldering in accordance with said temperature environment.

Further, the embodiment has the connector 100 described above and the substrate 160 having the contact pin 140 and the external terminal 110 mounted on the surface thereof, and it is thus possible to provide the connector assembly 10 on which the connector 100 provided with the outer bush 120 and the inner bush 130 is mounted on the surface of the substrate 160 by reflow soldering.

Further, the embodiment has the connector assembly 10 described above and the camera case 300 provided with a fitting part 311 to which the external connector 400 is configured to be fitted, and the connector 100 mounted on the connector assembly 10 is inserted in the camera case 300 with the outer bush 120 provided between the connector 100 and the camera case 300. Thus, it is possible to provide the camera module 1 without a so-called relay connector while ensuring the waterproofness between the camera case 300 and the external terminal 110 by the outer bush 120. Accordingly, screw holes or the like for fastening the relay connector can be omitted, and this enables a reduction in size of the camera module 1 or expansion of the space inside the camera case 300 (the space to contain the substrate 160 or the like) for the same size of the camera module 1. Further, the contact pin 140 is mounted on the surface of the substrate 160, and thus it is not required to ensure the contact stroke of the contact pin 140 inside the connector 100, and this also enables a reduction in size or expansion of the space inside the camera case 300.

Further, the assembly method includes the mounting step of installing the connector 100 on the surface of the substrate 160 provided with solder and the soldering step of exposing the substrate 160 having the installed connector 100 to a temperature environment where the solder melts (for example, a temperature environment at 200° C. or higher), and thus the connector 100 provided with the outer bush 120 and the inner bush 130 can be mounted on the surface of the substrate 160 by reflow soldering in a temperature environment at 200° C. or higher.

Further, the assembly method includes the preheat step before the soldering step, the preheat step is to expose the substrate 160 having the installed connector 100 to a temperature environment at 150° C. or higher and 180° C. or lower for 60 seconds or longer, and the soldering step is to expose the substrate 160 having the installed connector 100 to a temperature environment at 200° C. or higher and 260° C. or lower for 30 seconds or longer. Thus, the connector 100 can be mounted on the surface of the substrate 160 by reflow soldering in accordance with said temperature environment.

REFERENCE SIGNS LIST

1 camera module
10 connector assembly
100 substrate connector
110 external terminal (external conductor)
111 upper flange
111*a* cut face
112 lower flange
112*a* cut face
113 base
113*a* opening
113*b* cut-out
113*c* ground face
120 outer bush (first seal member)
121 terminal insertion hole
122 ridge
130 inner bush (second seal member)
131 pin insertion hole
132 ridge
140 contact pin (internal conductor)
141 rod-like part
141*a* latch claw
142 leg part
142*a* ground end
150 insulator
151 pin insertion hole
160 mount substrate (substrate)
161 pad
200 ground shell
210 ground pin
300 camera case (casing)
310 upper case
311 fitting part
311*a* protrusion
312 connector insertion hole
313 screw
320 lower case
400 external connector
500 mounter

The invention claimed is:

1. An assembly method for a connector assembly, the method comprising:

an assembly step of attaching a first seal member in close contact with an outer circumferential face of a cylindrical external conductor extending in an axis direction, attaching a second seal member in close contact with an inner circumferential face of the external conductor, and inserting an internal conductor into the second seal member along the axis direction inside the external conductor, to thereby assemble a connector;

a mounting step of installing the connector, with the first seal member and the second seal member attached thereto, on a surface of a substrate provided with solder; and a reflow soldering step of exposing the substrate, on which the connector with the first seal member and the second seal member attached thereto is installed, to a temperature environment where the solder melts, wherein the first seal member and the second seal member have heat resistance durable against a temperature in the reflow soldering step.

2. The assembly method according to claim 1, wherein the first seal member and the second seal member have heat resistance durable against a temperature of 200° C. or higher.

3. The assembly method according to claim 2, wherein the first seal member and the second seal member have heat resistance durable against a temperature of 200° C. or higher for 30 seconds or longer with a peak temperature being 260° C.

4. The assembly method according to claim 1, further comprising a preheat step before the soldering step, wherein the preheat step is to expose the substrate having the installed connector to a temperature environment at 150° C. or higher and 180° C. or lower for 60 seconds or longer, and wherein the soldering step is to expose the substrate having the installed connector to a temperature environment at 200° C. or higher and 260° C. or lower for 30 seconds or longer.

* * * * *